US 8,255,385 B1

(12) United States Patent
Sun et al.

(10) Patent No.: US 8,255,385 B1
(45) Date of Patent: Aug. 28, 2012

(54) ADAPTIVE CRAWL RATES BASED ON PUBLICATION FREQUENCY

(75) Inventors: Walter Sun, Bellevue, WA (US); Yipeng Li, Redmond, WA (US); Xiao Zhang, Beijing (CN); Junaid Ahmed, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/053,772

(22) Filed: Mar. 22, 2011

(51) Int. Cl.
    G06F 7/00 (2006.01)
    G06F 17/30 (2006.01)
(52) U.S. Cl. ......................... 707/709; 707/710
(58) Field of Classification Search .................. None
    See application file for complete search history.

(56) References Cited

U.S. PATENT DOCUMENTS

| | | | |
|---|---|---|---|
| 7,310,632 B2 | 12/2007 | Meek et al. | |
| 7,328,401 B2 | 2/2008 | Obata et al. | |
| 7,398,271 B1 | 7/2008 | Borkovsky et al. | |
| 7,496,557 B2 | 2/2009 | Balasubramanian et al. | |
| 7,599,920 B1 * | 10/2009 | Fox et al. | 1/1 |
| 7,769,742 B1 * | 8/2010 | Brawer et al. | 707/709 |
| 7,774,782 B1 * | 8/2010 | Popescu et al. | 718/104 |
| 7,885,952 B2 * | 2/2011 | Chellapilla et al. | 707/710 |
| 7,987,172 B1 * | 7/2011 | Carver | 707/709 |
| 8,032,518 B2 * | 10/2011 | Fox et al. | 707/713 |
| 2004/0225642 A1 * | 11/2004 | Squillante et al. | 707/3 |
| 2004/0225644 A1 | 11/2004 | Squillante et al. | |
| 2008/0104256 A1 | 5/2008 | Olston | |
| 2009/0150371 A1 * | 6/2009 | Dasdan et al. | 707/5 |
| 2010/0077098 A1 * | 3/2010 | Fox et al. | 709/233 |

OTHER PUBLICATIONS

Cho, et al., "Effective page refresh policies for Web crawlers", ACM Transactions on Database Systems, vol. 28, Issue 4, 2003, pp. 390-426.
Grimes, et al., "Keeping a Search Engine Index Fresh: Risk and optimality in estimating refresh rates for web pages", Available at: http://math.stanford.edu/~dford/papers/keeping_a_web_search_engine_fresh.pdf, 2008.
Adam, et al., "Efficient extraction of news articles based on RSS crawling", Available at: http://ru6.cti.gr/ru6/publications/5761ICMWI2010_is_Bouras.pdf, Oct. 2010.
Cho, et al, "Effective page refresh policies for Web crawlers", ACM Transactions on Database Systems, vol. 28, Issue 4, 2003, pp. 390-426.
Hurst, et al., "Social Streams Blog Crawler", In Proceedings of the 2009 IEEE International Conference on Data Engineering, 2009, 4 pages.
Cho, et al., "Estimating Frequency of Change", In Journal ACM Transactions on Internet Technology, vol. 3, Issue 3, Aug. 2003, 32 pages.
Sia, Ka Cheung., "Efficient Monitoring Algorithm for Fast News Alerts", In Journal IEEE Transactions on Knowledge and Data Engineering, vol. 19, Issue 7, Jul. 2007, 12 pages.
Edwards, et al., "An Adaptive Model for Optimizing Performance of an Incremental Web Crawler", In Proceedings of the 10th international conference on World Wide Web, 2001, 15 pages.

* cited by examiner

*Primary Examiner* — Tony Mahmoudi
*Assistant Examiner* — Tuan A Pham
(74) *Attorney, Agent, or Firm* — Shook Hardy & Bacon L.L.P.

(57) ABSTRACT

Methods and systems for determining an adaptive crawl rate for a Web crawler based on historical publication data from a Web source are provided. A frequency of publication of the Web source is determined over a specified period of time, and an adaptive crawl rate is calculated using the frequency of publication. The Web crawler is then deployed at the calculated adaptive crawl rate.

20 Claims, 3 Drawing Sheets

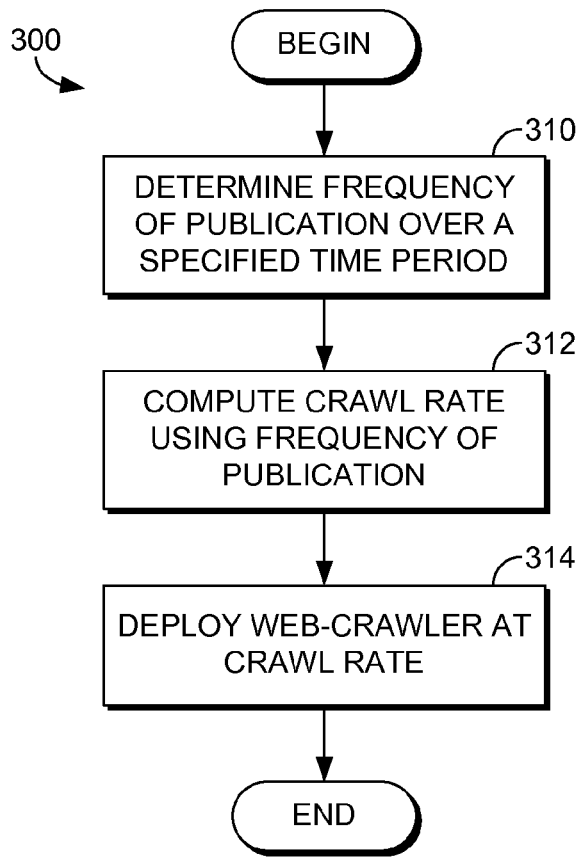
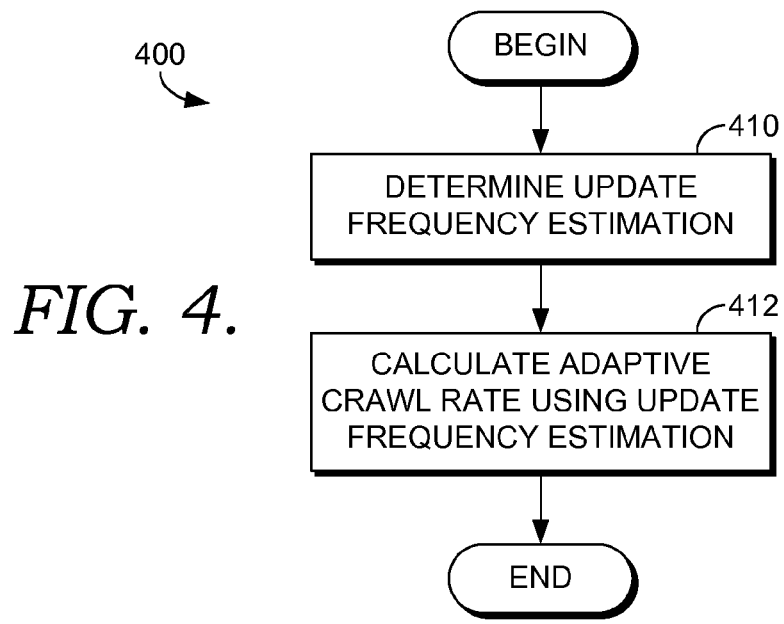

ADAPTIVE CRAWL RATES BASED ON PUBLICATION FREQUENCY

BACKGROUND

Search engine providers want to present the most up-to-date information to their users. However, the Web-crawlers that are utilized to retrieve this information from Web sources retrieve content at fixed intervals regardless of how frequently the Web source content updates. Thus, a Web-crawler could visit a Web page every ten minutes but be nine minutes late in retrieving up-to-date information. On the other hand, having the Web-crawler visit the Web page too often creates other problems, such as overloading the Website and/or wasting search engine resources.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable media for, among other things, determining an adaptive crawl frequency for a Web-crawler based upon historical publication data for a particular Web source. Utilizing embodiments of the invention, search engines may present up-to-date content to their users by deploying Web-crawlers at a frequency that maximizes the freshness of the content delivered to users while also minimizing overloading of the target Web server and/or wasting search engine resources.

BRIEF DESCRIPTION OF THE DRAWINGS

The present invention is described in detail below with reference to the attached drawing figures, wherein:

FIG. 3 is a flow diagram showing a method for adaptively deploying a Web-crawler at a crawl rate based on recent historical publication data, in accordance with an embodiment of the present invention; and FIG. 4 is a flow diagram showing a method for determining an adaptive crawl rate based on recent historical publication data for a Web source, in accordance with an embodiment of the present invention.

DETAILED DESCRIPTION

Figure 1:
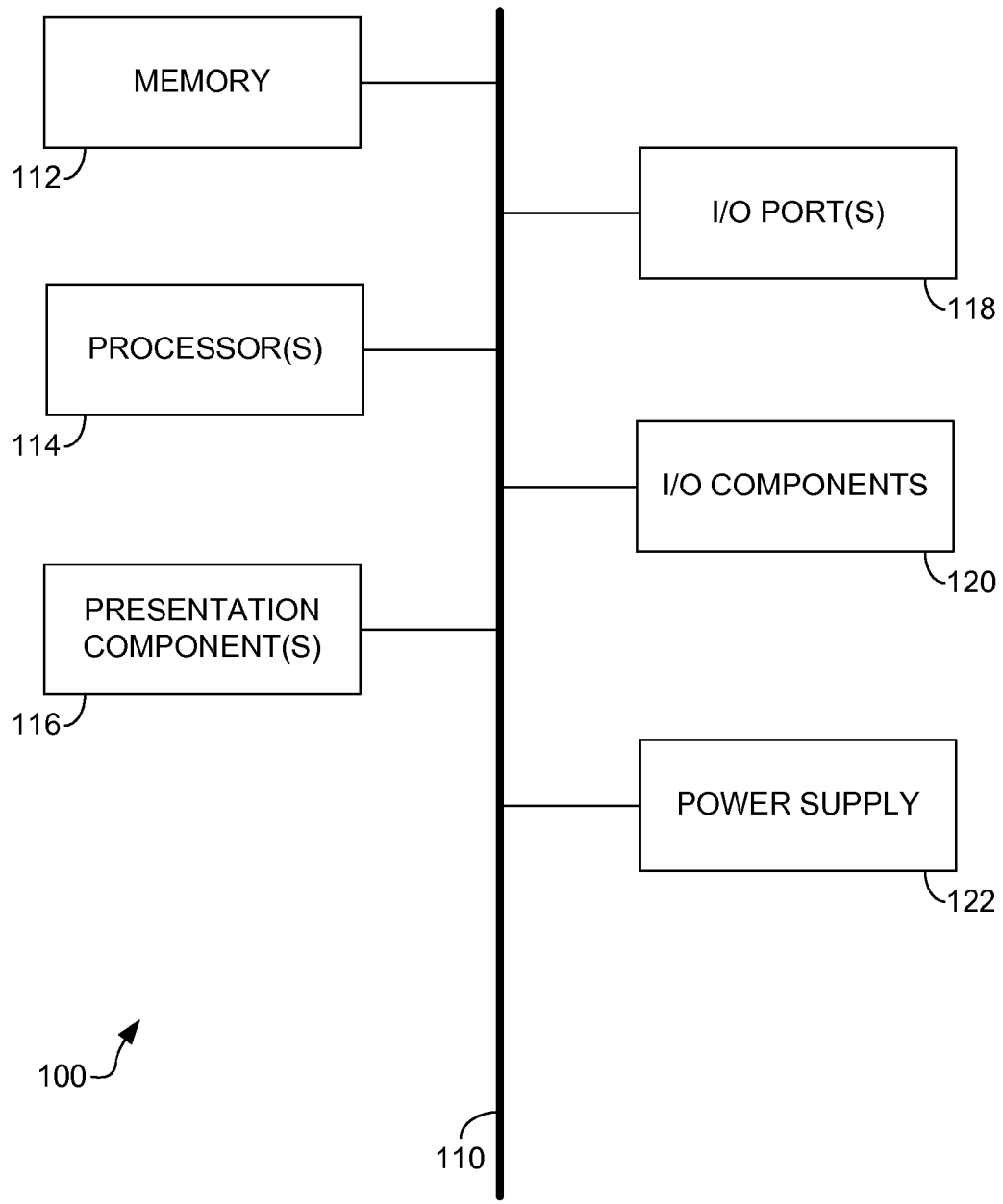
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable media for, among other things, determining an adaptive crawl frequency for a Web-crawler based upon historical publication data for a particular Web source. Utilizing embodiments of the invention, search engines may present up-to-date content to their users by deploying Web-crawlers at a frequency that maximizes the freshness of the content delivered to users while also minimizing overloading the target Web server and/or wasting search engine resources.

Accordingly, in one embodiment, the present invention is directed toward a system, including at least one processor and at least one computer-readable storage medium storing a plurality of components, comprising a retrieval component, a calculating component, and a deploying component. The retrieval component retrieves historical publication data corresponding to a recent period of time from a Web source. In turn, the calculating component calculates an adaptive crawl rate using the historical publication data, while the deploying component deploys a Web-crawler at the adaptive crawl rate.

In another embodiment, the present invention is directed to one or more computer-readable storage media storing computer-executable instructions, which, when executed by a computing device, cause the computing device to perform a method for adaptively deploying a Web-crawler at a crawl rate based on historical publication data for a particular Web page. For each of a plurality of Web pages, the method comprises determining a frequency of publication of the Web page over a specified period of time and calculating a crawl rate using the frequency of publication. The Web-crawler is then deployed at the calculated crawl rate.

In yet another embodiment, the present invention is directed to one or more computer-readable storage media storing computer-executable instructions, which, when executed by a computing device, cause the computing device to perform a method for determining an adaptive crawl rate based upon historical publication data for a particular Web page. The method includes determining an update frequency estimation for a particular Web page according to the formula:

$$F_i = \Sigma_{k=1}^{i} w_k F_{i-k}$$

where $F_i$ is the update frequency estimation for the particular Web page for a time period, i, $w_k$ is a weight factor given to a particular time segment, k, included in the time period, and $F_{i-k}$ is a publication rate of the particular Web page for a given time segment included in the time period. The method further includes calculating the adaptive crawl rate by multiplying the update frequency estimation by a constant.

An exemplary computing environment suitable for use in implementing embodiments of the present invention is described below in order to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a set of one or more processes distributed on one or more computers, one or more stand-alone storage devices, a set of one or more other computing or storage devices, a combination of one or more of the above, and the like.

Figure 2:
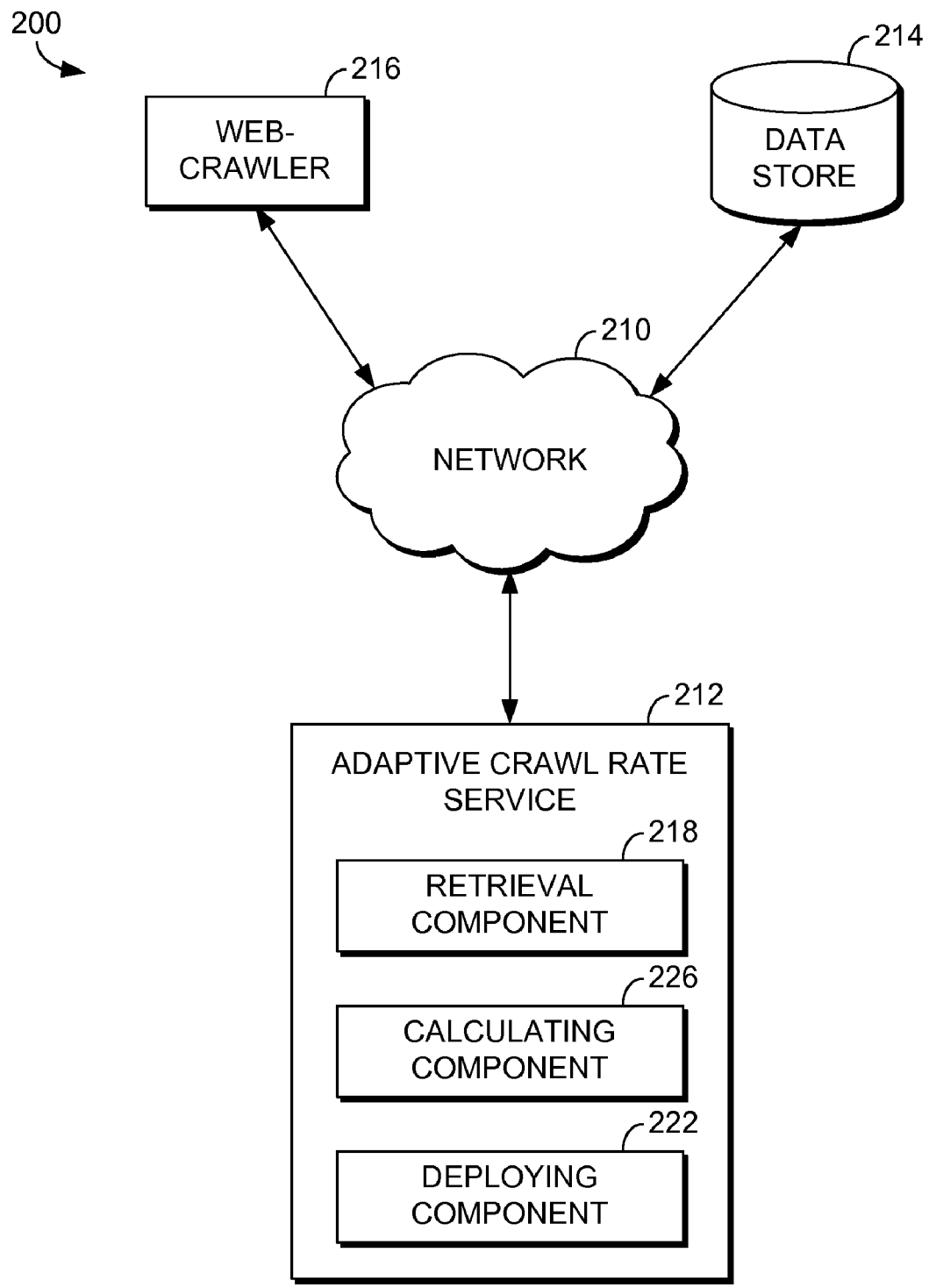
FIG. 2 is a block diagram of an exemplary system suitable for determining an adaptive crawl rate, in accordance with an embodiment of the present invention.

Turning now to FIG. 2, a block diagram is illustrated that shows an exemplary computing system environment 200 suitable for use in implementing embodiments of the present invention. It will be understood and appreciated by those of ordinary skill in the art that the computing system environment 200 shown in FIG. 2 is merely an example of one suitable computing system environment and is not intended to suggest any limitation as to the scope of use or functionality of embodiments of the present invention. Neither should the computing system environment 200 be interpreted as having any dependency or requirement related to any single module/component or combination of modules/components illustrated therein.

The computing system environment 200 includes an adaptive crawl rate service 212, a data store 214, and a Web-crawler 216 all in communication with one another via a network 210. The network 210 may include, without limitation, one or more local area networks (LANs) and/or wide area networks (WANs). Such networking environments are commonplace in offices, enterprise-wide computer networks, intranets and the Internet. Accordingly, the network 210 is not further described herein.

In some embodiments, one or more of the illustrated components/modules may be implemented as stand-alone applications. In other embodiments, one or more of the illustrated components/modules may be integrated directly into the operating system of the adaptive crawl rate service 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of servers, search engine computing devices, or the like. By way of example only, the adaptive crawl rate service 212 might reside on a server, cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 214 is configured to store information associated with Web page content, update frequencies associated with various Web pages, publication frequencies, and the like. In various embodiments, such information may include, without limitation, current, recent and/or historical update and refresh frequencies, Web publisher publication frequencies (historical and/or recent), current and historical publication frequencies, and the like. In embodiments, the data store 214 is configured to be searchable for one or more of the items stored in association therewith. It will be understood and appreciated by those of ordinary skill in the art that the information stored in association with the data store 214 may be configurable and may include any information relevant to publishers, publication frequencies (historical and current), refresh and/or update frequencies, and/or the like. The content and volume of such information are not intended to limit the scope of embodiments of the present invention in any way. Further, though illustrated as a single, independent component, the data store 214 may, in fact, be a plurality of storage devices, for instance, a database cluster, portions of which may reside on the adaptive crawl rate service 212, another external computing device (not shown), and/or any combination thereof.

The adaptive crawl rate service 212 shown in FIG. 2 may be any type of computing device, such as, for example, computing device 100 described below with reference to FIG. 1. By way of example only and not limitation, the adaptive crawl rate service 212 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof.

Components of the adaptive crawl rate service 212 may include, without limitation, a processing unit, internal system memory, and a suitable system bus for coupling various system components, including one or more data stores for storing information (e.g., files and metadata associated therewith). The adaptive crawl rate service 212 typically includes, or has access to, a variety of computer-readable media. By way of example, and not limitation, computer-readable media may include computer-storage media and communication media. In general, communication media enables each computing device to exchange data via a network, e.g., network 210. More specifically, communication media may embody computer-readable instructions, data structures, program modules, or other data in a modulated data signal, such as a carrier wave or other transport mechanism, and may include any information-delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, RF, infrared, and other wireless media. Combinations of any of the above also may be included within the scope of computer-readable media.

It will be understood by those of ordinary skill in the art that computing system environment 200 is merely exemplary. While the adaptive crawl rate service 212 is illustrated as a single unit, one skilled in the art will appreciate that the adaptive crawl rate service 212 is scalable. For example, the adaptive crawl rate service 212 may in actuality include a plurality of computing devices in communication with one another. Moreover, the database 214, or portions thereof, may be included within, for instance, the adaptive crawl rate service 212, a Website source, or a third-party service as a computer-storage medium. The single unit depictions are meant for clarity, not to limit the scope of embodiments in any form.

As shown in FIG. 2, the adaptive crawl rate service 212 comprises a retrieval component 218, a calculating component 220, and a deploying component 222. In some embodiments, one or more of the components 218, 220, and 222 may be implemented as stand-alone applications. In other embodiments, one or more of the components 218, 220, and 222 may be integrated directly into the operating system of a computing device such as the computing device 100 of FIG. 1. It will be understood by those of ordinary skill in the art that the components 218, 220, and 222 illustrated in FIG. 2 are exemplary in nature and in number and should not be construed as limiting. Any number of components may be employed to achieve the desired functionality within the scope of embodiments hereof.

The retrieval component 218 is configured to retrieve (via the network 120) historical publication data corresponding to a specified period of time from a particular Web page. The recent historical publication data may be accessed from a real simple syndication (RSS) feed, a hypertext markup language (HTML) document, a site map associated with the Website, or any combination thereof. As well, the historical publication data may be retrieved from the data store 214, a third-party service that compiles this type of data, or any combination thereof. Any and all such variations, and any combination thereof, are contemplated to be within the scope of embodiments of the present invention.

Historical publication data is data dealing with the number of times content of a Web page, Website, or Web feed is updated during a certain time period—most often the past 24 hours. By way of example, some publishers, such as news agencies, update up to 100 times per day due to the rapidly changing nature of the news. Other publishers update much less frequently, ranging from several times a day to once or twice a month and all variations in between. The historical publication data may be from a recent time period, or it may be from a time period at some point in the past. By way of example and not limitation, a particular Web page may have been updated frequently in the past, but is currently not being updated as frequently. Historical publication data may be gathered from the more recent time period or the less recent time period depending on the preference of the search engine provider. Any and all such variations, and any combination thereof, are contemplated to be within the scope of embodiments of the present invention.

The specified period of time for which historical publication data may be sampled varies depending on how frequently content on a particular Web page is updated. For example, the specified period of time for sampling the historical publication data may vary from 2 days up to 14 days for those Web pages whose content is updated frequently. In other words, historical publication data may be gathered for a 2 day period up to a 14 day period. In one aspect, the specified period of time for sampling varies from 5 days to 10 days if the source is updated more than 50 times per day. On the other hand, if the content of the Web page is updated infrequently, the specified time period for sampling may vary from 14 days up to 90 days. In one aspect, if the Web page is updated once per month, the specified period of time for sampling the historical publication data may vary from 60 days to 90 days. Any and all such variations, and any combination thereof, are contemplated to be within the scope of embodiments of the present invention.

Returning to FIG. 2, the calculating component 220 is configured to calculate an adaptive crawl rate using the historical publication data retrieved by the retrieval component 218. The adaptive crawl rate is calculated by determining a frequency of publication and multiplying the frequency of publication by a constant. In one aspect, the frequency of publication is a weighted sum of past frequencies of publication.

Even more specifically, in one aspect, the frequency of publication, also known as an update frequency estimation, may be determined by a formula:

$$F_i = \Sigma_{k=1}^{i} w_k F_{i-k}$$

where $F_i$ is the update frequency estimation for a particular Web page for a time period, i, $w_k$ is a weight factor assigned to a particular time segment, k, included in the time period, and $F_{i-k}$ is a publication rate of the particular Web page for a given time segment included in the time period. The time period, i, corresponds to the specified period of time or sampling period outlined above with respect to the retrieval component 218.

In one aspect, the weight factor is the same for each time segment of the time period. In other words, all time segments in the time period are weighted equally. In general terms, when all time segments in the time period are weighted equally, $w_k$ is set to 1/i. By way of illustrative example, if the time segment is one day and there are seven days in the time period, the weight factor would be set to 1/7. In another aspect of the invention, some time segments in the time period may be weighted differently. For example, time segments at the end of the time period (which correspond to more recent time segments) may be weighted more heavily than time segments at the beginning of the time period. Continuing, the adaptive crawl rate is calculated by multiplying the update frequency estimation by a constant. In one aspect, the constant a value that minimize staleness of content associated with the particular Web page. In yet another aspect, the constant is two.

With continued reference to FIG. 2, the deploying component 222 is configured to deploy a Web-crawler, such as the Web-crawler 216, at the adaptive crawl rate. Such Web-crawlers are commonplace in computing environments. Accordingly, Web-crawler 216 is not further described herein.

By way of illustrative example, and not by limitation, suppose the retrieval component 218 retrieves the following historical publication data for a seven day period of time for a particular news-related Web page:

| Day 0 | 100 updates/day |
|---|---|
| Day 1 | 85 updates/day |
| Day 2 | 93 updates/day |
| Day 3 | 67 updates/day |
| Day 4 | 98 updates/day |
| Day 5 | 91 updates/day |
| Day 6 | 82 updates/day |

If all days (i.e., time segments) are weighted equally, the update frequency estimation, $F_i$, is calculated as follows:

$$\Sigma_{k=1}^{7} w_k F_{7-k} = 1/7(82) + 1/7(91) + 1/7(98) + 1/7(67) + 1/7(93) + 1/7(85) + 1/7(100)$$

$$\Sigma_{k=1}^{7} w_k F_{7-k} = 88$$

As such, the adaptive crawl rate would be equal to 2(88) or 176. Thus, in order to capture the latest news from this particular news-related Web page, a Web-crawler would be deployed to the Web page 176 times per day, which is approximately 7 times per hour. This crawl rate maximizes freshness of the content acquired from the Web page while also saving on resources and minimizing overloading the Web page.

The update frequency estimation, $F_i$, may be determined as frequently as desired by the search engine provider. In one aspect, it may be determined at least once per day up to once every couple of weeks, while in another aspect, the update frequency estimation may be determined at least once every two weeks. Any and all such variations, and any combination thereof, are contemplated to be within the scope of embodiments of the present invention. As well, the variables in the equation may be customized for each Web page crawled by a Web crawler.

Turning now to FIG. 3, a method, referenced generally by the numeral 300, is depicted for adaptively deploying a Web-crawler at a crawl rate based on historical publication data. At step 310, a frequency of publication of a publisher's Website over a specified period of time is determined, while at step 312, the crawl rate is calculated using the frequency of publication. In turn, at step 314, the Web-crawler is deployed at the calculated crawl rate.

Turning to FIG. 4, a method, referenced generally by the numeral 400, is depicted for determining an adaptive crawl rate based upon historical publication data. At step 410, an update frequency estimation is determined by using the formula outlined above. At step 412, the adaptive crawl rate is determined by multiplying the update frequency estimation by a constant.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3 and the method 400 of FIG. 4 are not meant to limit the scope of the present invention in any way and, in fact, the steps may occur in a variety of different sequences within embodiments hereof. Any and all such variations, and any combination thereof, are contemplated to be within the scope of embodiments of the present invention.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A system for adaptively deploying a Web-crawler to a Web source at a crawl rate based on historical publication data for the Web source, the system comprising:
   a computing device associated with a search engine having one or more processors and one or more computer-readable storage media; and
   a data store coupled with the search engine,
   wherein the search engine:
      determines an update frequency estimation for a particular Web page, the update frequency estimation being determined according to:

$F_i = \Sigma_{k=1}^{i} w_k F_{i-k}$

A) wherein $F_i$ is the update frequency estimation for the particular Web page for a time period, i,
      B) wherein $w_k$ is a weight factor given to a particular time segment, k, included in the time period, and
      C) wherein $F_{i-k}$ is a publication rate for a given time segment included in the current time period; and
      calculates the adaptive crawl rate by multiplying the update frequency estimation for the particular Web page by a constant.

2. The system of claim 1, wherein the publication rate is determined from a real simple syndication (RSS) feed, a hypertext markup language (HTML) document, a site map, or any combination thereof, associated with the particular Web page.

3. The system of claim 1, wherein the given time segment varies depending upon how frequently the Web source is updated.

4. The system of claim 3, wherein the given time segment varies from five days to ten days if the particular Web page is updated frequently.

5. The system of claim 4, wherein the given time segment varies from five days to ten days if the particular Web page is updated more than fifty times per day.

6. The system of claim 3, wherein the given time segment varies from 30 days to 90 days if the particular Web page is updated infrequently.

7. The system of claim 6, wherein the given time segment varies from 60 days to 90 days if the particular Web page is updated once a month.

8. A computerized method carried out by a search engine running on a processor for adaptively deploying a Web-crawler at a crawl rate based on historical publication data, the method comprising:
   determining, using the processor, an update frequency estimation for a particular Web page, the update frequency estimation being determined according to:

$F_i = \Sigma_{k=1}^{i} w_k F_{i-k}$

A wherein $F_i$ is the update frequency estimation for the particular Web page for a time period, i,
   a) wherein $w_k$ is a weight factor given to a particular time segment, k, included in the time period, and
   C) wherein $F_{i-k}$ publication rate for a given time segment included in the current time period; and
   calculating the adaptive crawl rate by multiplying the update frequency estimation for the particular Web page by a constant.

9. The method of claim 8, wherein the update frequency estimation is determined between once per day and once every fourteen days.

10. The method of claim 8, wherein the time period, i, the weight factor, $w_k$, and the constant are customized for each of a plurality of Web pages.

11. The method of claim 8, wherein the constant is a value that minimizes staleness of content associated with the particular Web page.

12. The method of claim 11, wherein the constant is two.

13. One or more computer-readable storage devices not consisting of a signal and storing computer-executable instructions, which, when executed by a computing device, cause the computing device to perform a method for determining an adaptive crawl rate based upon historical publication data, the method comprising:
   determining an update frequency estimation for a particular Web page, the update frequency estimation being determined according to:

$F_i = \Sigma_{k=1}^{i} w_k F_{i-k}$

A) wherein $F_i$ is the update frequency estimation for the particular Web page for a time period, i,
   B) wherein $w_k$ is a weight factor given to a particular time segment, k, included in the time period, and
   C) wherein $F_{i-k}$ is a publication rate for a given time segment included in the current time period; and
   calculating the adaptive crawl rate by multiplying the update frequency estimation for the particular Web page by a constant.

14. The one or more computer-readable storage devices of claim 13, wherein the update frequency estimation is determined between once per day and once every fourteen days.

15. The one or more computer-readable storage a devices of claim 14, wherein the update frequency estimation is determined once every fourteen days.

16. The one or more computer-readable storage devices of claim 13, wherein the time period, i, the weight factor, $w_k$, and the constant are customized for each of a plurality of Web pages.

17. The one or more computer-readable storage devices of claim 13, wherein the weight factor, $w_k$, is equivalent for each equivalent time segment, k, included in the time period, i.

18. The one or more computer-readable storage devices of claim 17, wherein the weight factor, $w_k$, is 1/i.

19. The one or more computer-readable storage devices of claim 13, wherein the weight factor, $w_k$, of at least two equivalent time segments, k, included in the time period, i, differ from one another.

20. The one or more computer-readable storage a devices of claim 19, wherein a weight factor, $w_k$, given to time segments occurring later in the time period, i, is greater than a weight factor, $w_k$, given to time segments occurring earlier in the time period, i.

* * * * *